US008458172B2

(12) United States Patent
Gerber et al.

(10) Patent No.: US 8,458,172 B2
(45) Date of Patent: Jun. 4, 2013

(54) METHOD AND APPARATUS FOR AUTOMATED END TO END CONTENT TRACKING IN PEER TO PEER ENVIRONMENTS

(75) Inventors: Alexandre Gerber, Madison, NJ (US); Subhabrata Sen, New Providence, NJ (US); Oliver Spatscheck, Randolph, NJ (US); Ajay Todimala, Silver Spring, MD (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 265 days.

(21) Appl. No.: 12/647,346

(22) Filed: Dec. 24, 2009

(65) Prior Publication Data

US 2011/0161313 A1 Jun. 30, 2011

(51) Int. Cl.
*G06F 7/00* (2006.01)
*G06F 17/30* (2006.01)
(52) U.S. Cl.
USPC .......................................................... 707/723
(58) Field of Classification Search
USPC .................. 707/723, 622; 709/205, 218, 227, 709/232
See application file for complete search history.

(56) References Cited

U.S. PATENT DOCUMENTS

| 6,578,048 | B1* | 6/2003 | Mauldin ............................... 1/1 |
| 7,680,937 | B2* | 3/2010 | Miller et al. ................... 709/226 |
| 2005/0198061 | A1* | 9/2005 | Robinson et al. ............. 707/102 |
| 2006/0168142 | A1* | 7/2006 | Juszkiewicz .................. 709/219 |
| 2006/0170759 | A1* | 8/2006 | Roever et al. .............. 348/14.03 |
| 2006/0229904 | A1* | 10/2006 | Hunter et al. ...................... 705/1 |
| 2007/0055660 | A1* | 3/2007 | Anderson .......................... 707/4 |
| 2007/0233564 | A1* | 10/2007 | Arnold ............................ 705/14 |
| 2007/0247979 | A1* | 10/2007 | Brillon et al. .............. 369/30.06 |
| 2008/0003990 | A1* | 1/2008 | Agrawal et al. ............. 455/414.3 |
| 2008/0010372 | A1* | 1/2008 | Khedouri et al. ............. 709/224 |
| 2008/0066182 | A1* | 3/2008 | Hickmott et al. ............... 726/26 |
| 2008/0077568 | A1* | 3/2008 | Ott ..................................... 707/5 |
| 2008/0183794 | A1* | 7/2008 | Georgis et al. ................ 709/201 |
| 2008/0208976 | A1* | 8/2008 | Chapalamadugu et al. .. 709/205 |
| 2008/0288629 | A1* | 11/2008 | Fisher et al. .................. 709/224 |
| 2009/0083132 | A1* | 3/2009 | Doganaksoy et al. .......... 705/11 |
| 2009/0133079 | A1* | 5/2009 | Li et al. ............................ 725/93 |
| 2009/0182815 | A1* | 7/2009 | Czechowski et al. ......... 709/206 |
| 2010/0036854 | A1* | 2/2010 | Regan et al. .................... 707/10 |

* cited by examiner

*Primary Examiner* — Robert Beausoliel, Jr.
*Assistant Examiner* — Nicholas Allen

(57) ABSTRACT

A method, computer readable medium and system for automatically tracking content in a peer-to-peer environment are disclosed. For example, the method monitors a number of times each content title of a plurality of content titles are downloaded in the peer-to-peer environment, adds one or more content titles of the plurality of content titles that are downloaded above a predetermined threshold to a list, downloads each one of the one or more content titles in the list via the peer-to-peer environment and verifies that each one of the one or more content titles that are downloaded matches at least one content title in the list.

20 Claims, 4 Drawing Sheets

METHOD AND APPARATUS FOR AUTOMATED END TO END CONTENT TRACKING IN PEER TO PEER ENVIRONMENTS

BACKGROUND

Content distribution using peer-to-peer protocols (P2P) accounts for a large percentage of traffic generated on the Internet. The content may be legitimately or illegitimately distributed via P2P. For example, some content may be legitimately purchased and downloaded by users via P2P. However, some content may be pirated and illegally copied and distributed P2P violating copyright laws and reducing revenue for the content producers and distributors.

Currently, no system exists for monitoring what content is distributed via P2P. If an individual wants to track a particular content title that is distributed via P2P, the individual must track content on a single content title basis. In other words, the individual must know ahead of time which content title they want to monitor and perform the monitoring manually for each content title. This becomes a very time consuming and laborious process.

SUMMARY

In one embodiment, the present disclosure discloses a method, a computer readable medium and a system for automatically tracking content in a peer-to-peer environment are disclosed. For example, the method monitors a number of times each content title of a plurality of content titles are downloaded in the peer-to-peer environment, adds one or more content titles of the plurality of content titles that are downloaded above a predetermined threshold to a list, downloads each one of the one or more content titles in the list via the peer-to-peer environment and verifies that each one of the one or more content titles that are downloaded matches at least one content title in the list.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
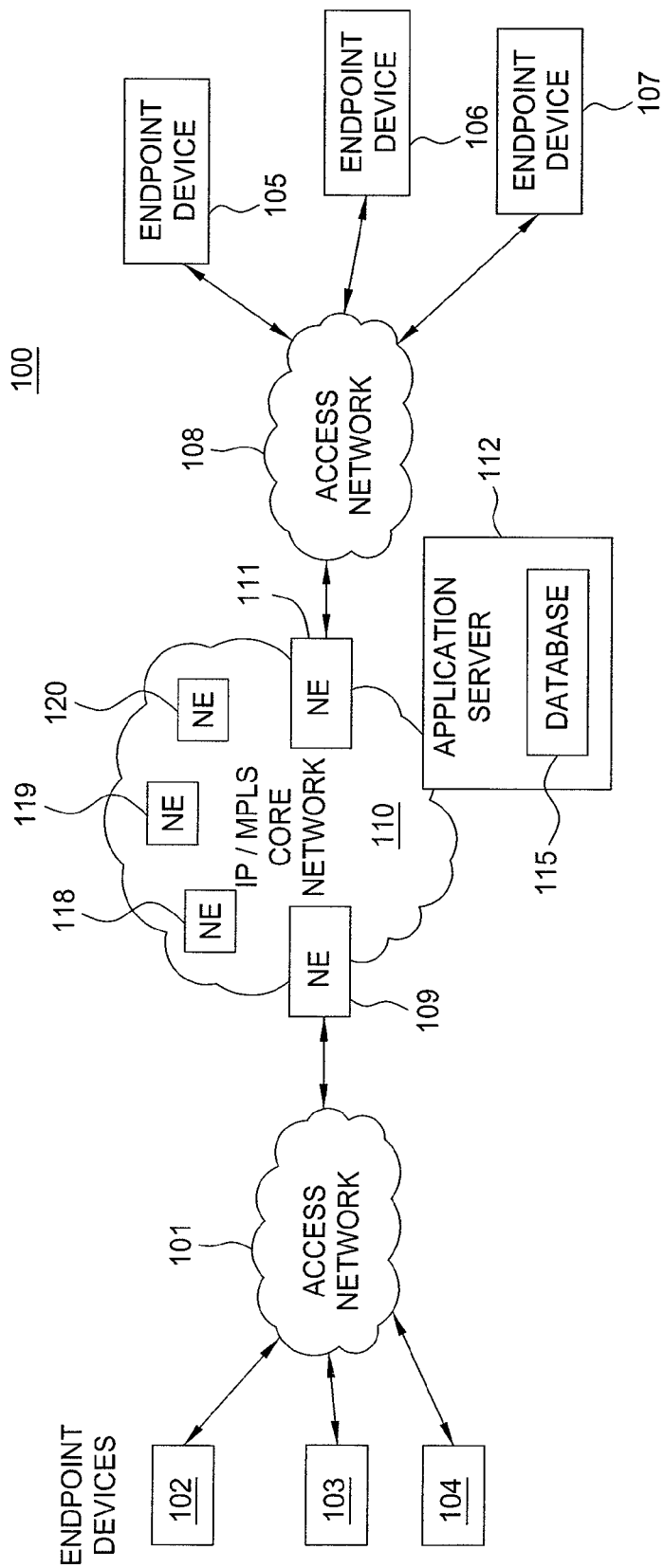
FIG. 1 illustrates an exemplary network related to the present disclosure.

The present disclosure broadly discloses a method and apparatus for providing automated end-to-end content tracking in peer-to-peer environments. FIG. 1 is a block diagram depicting an exemplary network 100 related to the current disclosure. Exemplary networks include cellular networks, internet protocol networks, packet networks, and the like.

FIG. 1 is a block diagram depicting an exemplary packet network 100 related to the current disclosure. Exemplary packet networks include packet networks, e.g., Internet Protocol (IP) networks, Asynchronous Transfer Mode (ATM) networks, Frame-Relay networks, and the like. An IP network is broadly defined as a network that uses Internet Protocol such as IPv4 or IPv6, and the like to exchange data packets.

In one embodiment, the packet network may comprise a plurality of endpoint devices 102-104 configured for communication with a core packet network 110 (e.g., an IP based core backbone network supported by a service provider) via an access network 101. Similarly, a plurality of endpoint devices 105-107 are configured for communication with the core packet network 110 via an access network 108. The network elements (NEs) 109 and 111 may serve as gateway servers or edge routers (e.g., broadly as a border element) for the network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), and the like.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, honeypot, a router, or like device.

The IP/MPLS core network 110 may also comprise an application server 112 that contains a database 115. The application server 112 may comprise any server or computer that is well known in the art, and the database 115 may be any type of electronic collection of data that is also well known in the art. The application server 112 embodies as hardware various modules and components that perform the automated end-to-end content tracking discussed below. It should be noted that one or more application servers 112 may be used to deploy each one of the various modules and components that perform the automated end-to-end content tracking. In addition, it should be noted that the application server 112 may be physically within the IP/MPLS core network 110 or may be offloaded outside of the IP/MPLS core network 110 and operated by a third party.

In one embodiment, the endpoint devices 102-107 may communicate with one another in a peer-to-peer environment. For example, the endpoint device 102 may download content from the endpoint device 105 via the access network 101, the IP/MPLS core network 110 and the access network 108. The content may be any type of content (e.g., movies, video games, pictures, electronic books, and the like). Alternatively, the endpoint device 102 may download content from the endpoint device 104 via only the access network 101. In other words, any one of the endpoint devices 102-107 may download content from any one of the endpoint devices 102-107 via any one of the access network 101 or 108 and/or the IP/MPLS core network 110.

It should be noted that although only six endpoint devices, two access networks, and five network elements are depicted in FIG. 1, the communication system 100 may be expanded by including additional endpoint devices, access networks, network elements, or application servers without altering the scope of the present disclosure. The above IP network is described to provide an illustrative environment in which packets are transmitted on networks in a peer-to-peer environment. The current disclosure discloses a method and apparatus for automatically tracking content in a peer-to-peer environment, e.g., the network 100 illustrated in FIG. 1 and as described above.

Figure 2:
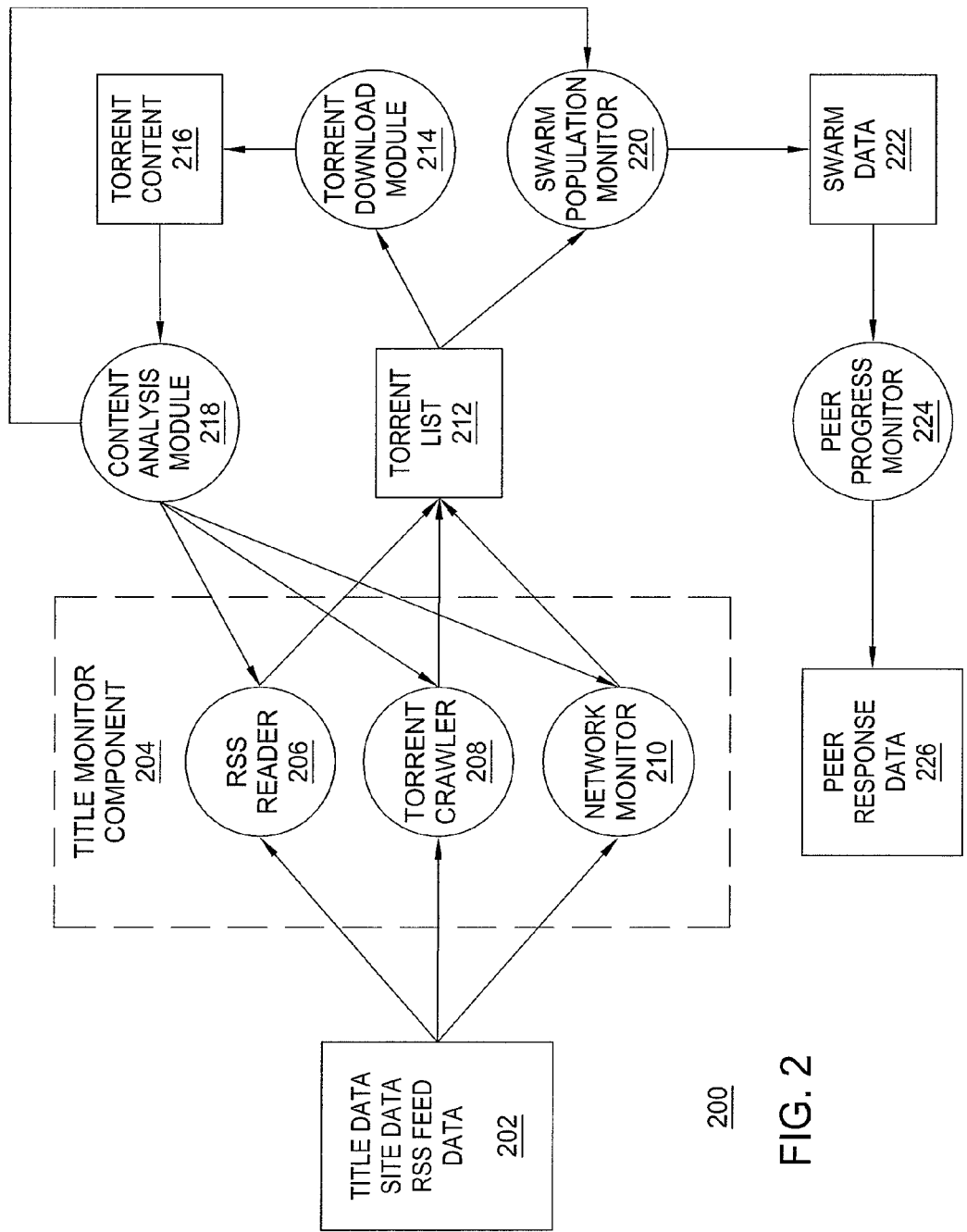
FIG. 2 illustrates a high level block diagram of the present disclosure.

FIG. 2 illustrates a high level block diagram of a system 200 for automatically tracking content in peer-to-peer environments. The examples provided below are in reference to a particular protocol known as BitTorrent. However, it should be noted that the system 200 may be modified to be compatible with any type of peer-to-peer protocol or environment in accordance with the general principles described below. In addition, as noted above, one or more of the modules or components in FIG. 2 may be embodied in a single application server 112 or may be distributed in any combination in multiple application servers 112.

The system 200 includes a title monitor component (TMC) 204, a torrent download module (TDM) 214, a content analysis module (CAM) 218, a swarm population monitor (SPM) 220 and a peer progress monitor (PPM) 224. Blocks 202, 212, 216, 222 and 226 represent output or input data from or to one or more of the modules and components listed above.

The TMC 204 comprises a RSS reader module 206, a torrent crawler module 208 and a network monitor module 210. The data block 202 provides data to operate the RSS reader module 206, the torrent crawler module 208 and the network monitor module 210. The objective of the TMC 204 is to obtain a list of the most popular content titles that are currently being downloaded in a peer-to-peer environment. For example, the most popular content is pre-defined by the user. In one example, most popular is defined as being content titles that have been downloaded over a predefined threshold (e.g. 1 million downloads). Alternatively, most popular is defined as being content titles that have been downloaded over a predefined threshold within a predefined period of time (e.g., 5 million downloads within 24 hours or 2 days or 1 week).

The TMC 204 determines which content titles to monitor based upon data received from the data block 202. The data block 202 contains data such as title data, website data and RSS feed data. The title data may comprise titles of the content that are being downloaded via the peer-to-peer environment. The RSS feed data provides data on which websites provide RSS feeds. RSS feeds are used by websites to publish frequently updated works such as blog entries, news headlines, audio and video in a standardized format that also include metadata. This data can be used by the RSS reader module 206 to monitor the downloaded content titles on RSS feeds. For example, the RSS reader module 206 can subscribe to one or more of the RSS feeds.

The website data may comprise domain names, hyperlinks and universal resource locators (URLs). Notably, some websites do not provide RSS feeds. As a result, the website data may be used by the torrent crawler module 208 and the network monitor module 210 to monitor the downloaded content tiles on the various websites associated with the domain names, hyperlinks and URLs in the website data. For example, the torrent crawler module 208 may crawl search engines or the network monitor module 210 may use network probes to intercept peer-to-peer communications.

The TMC 204 may be run continuously or periodically (e.g., every hour, every day, every week, etc). The RSS reader module 206, the torrent crawler module 208 and the network monitor module 210 may be programmed to exclude false positives when identifying content titles for a particular content type such as movies. For example, some titles may be used for multiple content types such as video games, movies, electronic books, television shows and the like. However, the user may only want to monitor the most popular movies that are being downloaded in the peer-to-peer environment. Thus, an exclude list may be implemented to identify and discard these false positives.

In addition, the RSS reader module 206, the torrent crawler module 208 and the network monitor module 210 may be programmed to avoid revisiting the same URL, domain names or hyperlink. For example, a hash table is maintained of all previously explored URLs, domain names or hyperlinks.

After a predefined time period, the TMC 204 compiles a list of the most popular content titles from all of the content titles that are monitored from the data block 202. For example, the data block 202 may provide ten titles A-J to monitor. After monitoring for 24 hours, the TMC 204 determines that only titles A, B and D have been downloaded over a predefined threshold, for example of 1 million times within the 24 hour time period.

The list of the most popular content titles is outputted as a data block 212. The data block 212 may include a torrent associated with each content title in the list. A torrent is meta-information file that is an encoded dictionary of one or more of the following keys: info, announce, creation-date, comment or created-by. In addition, the list may be ordered from most popular to least popular.

The data block 212 is then provided to both the TDM 214 and the SPM 220. The TDM 214 attempts to download each content on the list provided by the data block 212. For example, under the BitTorrent protocol, the TDM 214 continuously participates in all swarms for a content title and downloads their torrent content. After the TDM 214 finishes downloading content associated with a content title from the list of most popular content titles provided by the data block 212, the TDM 214 stops participating in the swarm as a seeder.

The output of the TDM 214 is the torrent content titles that are downloaded and provided in a data block 216. The CAM 218 analyzes each content title that is downloaded in the data block 216.

The CAM 218 performs media analysis and classification of the content titles that are successfully downloaded by the TDM 214. The process is performed in two steps. In the first step, the CAM 218 extracts media and metadata information of the downloaded content titles, such as for example, container format, audio and video media codecs used, application used for the encoding, presence of subtitles, etc. The downloaded content titles are then clustered into video and non-video content. The clustered video content is then further clustered based upon various characteristics found in the extracted metadata, such as for example, the container formats and the video and audio formats.

In the second step, the downloaded content titles are analyzed to verify that it is actually a copy of the content title that was identified by the list of the most popular content titles obtained by the TMC 204. This process involves generating a content signature of each one of the downloaded content titles and determining if the content signature matches a content signature of any one of the content titles obtained by the TMC 204.

After the CAM 218 verifies each one of the downloaded content titles, the results of the verification may be passed to the TMC 204 and the SPM 220. The results of the verification may be used to update the list of the most popular content titles obtained by the TMC 204 or for determining which swarms to monitor by the SPM 220. For example, the CAM 218 may determine that most of the downloads for a particular content title are not a movie, but rather an older television show of the same title. As a result, the content titles in the list of the most popular content titles obtained by the TMC 204 may be modified.

Referring back to the SPM 220, the SPM 220 continuously monitors a number of peers participating in a swarm. To continuously monitor all the swarms for a given content title, the SPM 220 runs in cycles of a predefined duration, e.g., 20 minutes. For every swarm, the SPM 220 starts by sending a request for peers to all the trackers listed in the torrent file of each of the content titles in the list of most popular content titles. The SPM 220 contacts all the trackers periodically, e.g., every 30 seconds, as long as the number of unanswered requests to a tracker is less than a predefined threshold value, e.g., 10. If none of the trackers respond, the SPM 220 continues to send requests to the trackers for a minimum time period, e.g., 120 seconds or a maximum number, e.g., 4 to all the trackers.

The SPM 220 uses the above mechanism to account for any network delays and tracker timeouts due to overload. For every response from the trackers, the SPM 220 updates a unique list of peers for each swarm. The SPM 220 counts the total number of unique and duplicate peers from all the tracker responses. The SPM 220 stops if the ratio of unique peers to duplicate peers for a swarm becomes less than a predefined threshold, e.g., 0.05. The SPM 220 also stops if the predefined threshold is not reached after a predefined time limit, e.g., 480 seconds.

The output of the SPM 220 is a list of unique peers provided as a swarm data block 222. The data from the swarm data block 222 is provided to a PPM 224.

The PPM 224 continuously monitors the download progress of the all the peers in each swarm of a content title being monitored. In other words, the PPM 224 verifies that the peers are actually downloading the content titles in the list of the most popular content titles and that the content downloaded by the peers is the actual content in the list of the most popular content titles.

Similar to the SPM 220, the PPM 224 also runs in continuous cycles of a predefined duration, e.g., 5 minutes. The PPM 224 contacts a predefined number of peers within a predefined time period, e.g., 10 peers every 100 milliseconds.

In some peer-to-peer protocols, e.g. BitTorrent, each peer maintains a BitField vector of size n where bit '1' in an $i^{th}$ position indicates that the peer has downloaded the $i^{th}$ piece of the content title. When a connection is established with a peer, the peer responds with its BitField vector. If a handshake succeeds with a peer, the PPM 224 receives the peer's BitField vector and then the connection with the peer is closed. This process continues until all of the peers are reached or for a predefined maximum time limit, e.g., 500 seconds. The PPM 224 outputs the results as peer respond data in a data block 226.

As a result, the present disclosure automatically tracks content that is downloaded in a peer-to-peer environment. In doing so, the present disclosure automatically identifies the most popular content titles to monitor and tracks and identifies a number of unique peers for each of the content titles. Information that is collected from the present disclosure may be valuable and used for a variety of applications. For example, the present disclosure may be used to determine which content titles are being illegally distributed and by whom. In another example, the present disclosure may be used to determine which content title downloads are creating the most network congestion. This information may in turn be used for capacity planning and the like.

Figure 3:
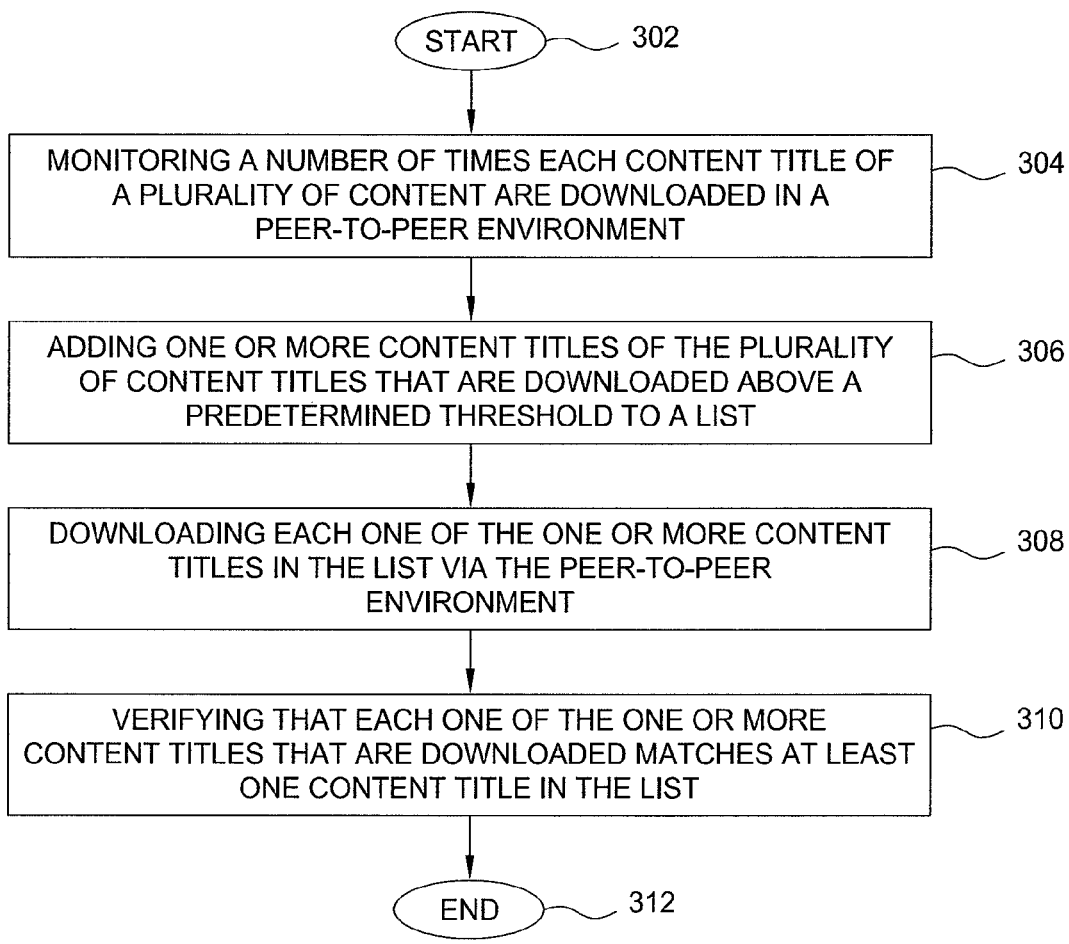
FIG. 3 illustrates a flowchart of a method for automatically tracking content in a peer-to-peer environment.

FIG. 3 illustrates a flowchart of a method 300 for automatically tracking content in a peer-to-peer environment. In one embodiment, one or more steps of the method 300 may be implemented by the application server 112 having one or more modules or components of the system 200 or a general purpose computer having a processor, a memory and input/output devices as discussed below with reference to FIG. 4.

The method 300 begins at step 302. At step 304, the method 300 monitors a number of times each content title of a plurality of content titles are downloaded in a peer-to-peer environment. In one embodiment, the peer-to-peer environment may be using a BitTorrent protocol. As discussed above, the monitoring may be performed by the TMC 204. In one embodiment, the monitoring is performed by crawling search engines, subscribing to one or more RSS feeds or using network monitor probes that intercept peer-to-peer communications.

At step 306, the method 300 adds one or more content titles of the plurality of content titles that are downloaded above a predetermined threshold to a list. As discussed above, the TMC 204 may monitor each content title provided by the data block 202. For each content title, the TMC 204 tracks each time the content title is downloaded over the peer-to-peer environment. If the total number of downloads for a content title exceeds a predetermined threshold, e.g. 1 million downloads, then the content title is added to a list of the most popular content titles. As noted above, the predefined threshold may be within a predefined time period, e.g. 1 million downloads within a 24 hour time period.

At step 308, the method 300 downloads each one of the one or more content titles in the list via the peer-to-peer environment. For example, the TDM 214 downloads For example, under the BitTorrent protocol, the TDM 214 continuously participates in all swarms for a content title and downloads their torrent content.

At step 310, the method 300 verifies that each one of the one or more content titles that are downloaded matches at least one content title in the list. As discussed above, the CAM 218 may perform the verification process. In one embodiment, the verification comprises generating a content signature of each one of the one or more content titles that are downloaded. Then the CAM 218 determines whether the content signature of the each one of the one or more content titles that are downloaded matches at least one content signature of a content title in the list. Based upon the verification, the list may be modified if the content titles actually being downloaded do not match the content titles in the list. For example, as discussed above, the content titles in the list may be looking for a recently released movie; however, the actually downloaded content titles may be a television show that had an identical title or may be a peer attempting to disseminate a virus under a disguise of the content title and so forth. The method 300 ends at step 310.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application.

Figure 4:
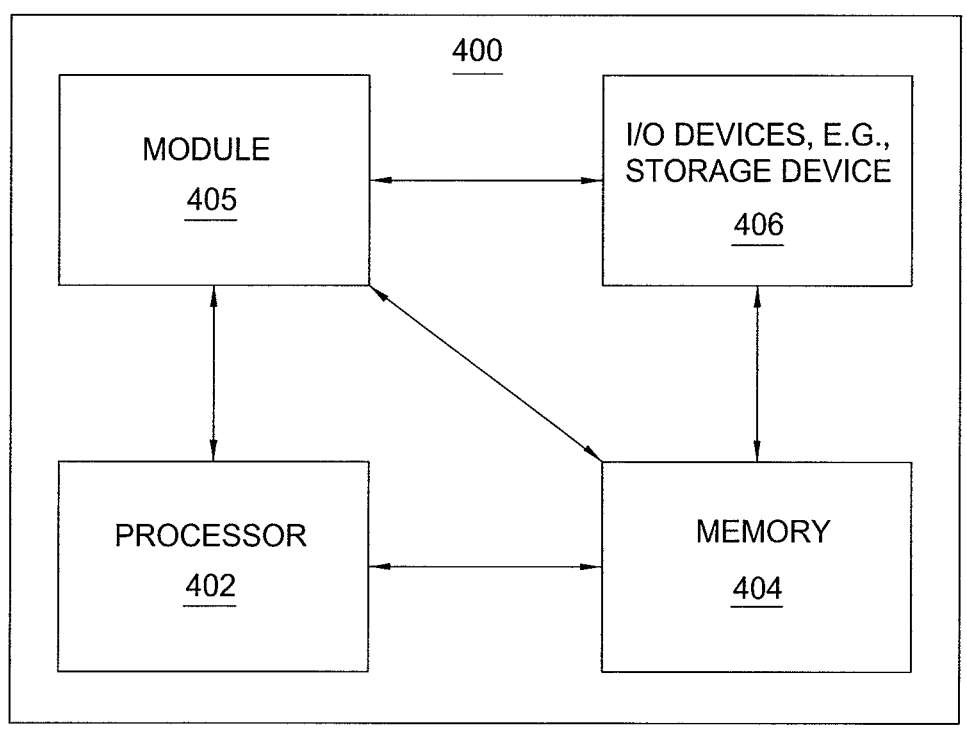
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing automated end-to-end content tracking in peer-to-peer environments, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 405 for providing automated end-to-end content tracking in peer-to-peer environments can be loaded into memory 404 and executed by processor 402 to implement the functions as discussed above. As such, the present method 405 for providing automated end-to-end content tracking in peer-to-peer environments (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for tracking content in a peer-to-peer environment, comprising:
    monitoring, by a processor, a number of times each content title of a plurality of content titles are downloaded in the peer-to-peer environment;
    adding, by the processor, a content title of the plurality of content titles that is downloaded above a predetermined threshold to a list;
    downloading, by the processor, the content title in the list via the peer-to-peer environment; and
    verifying, by the processor, that the content title that is downloaded matches a content title in the list.

2. The method of claim 1, wherein monitoring comprises crawling search engines.

3. The method of claim 1, wherein the list comprises a torrent associated with the content title in the list.

4. The method of claim 1, wherein the verifying comprises:
    generating a content signature of the content title that is downloaded; and
    determining whether the content signature of the content title that is downloaded matches a content signature of a content title in the list.

5. The method of claim 1, wherein the list is ordered from most popular to least popular.

6. The method of claim 1, further comprising:
    identifying each unique user that has downloaded the content title in the list.

7. The method of claim 6, further comprising:
    contacting the each unique user to request to download from the each unique user the content title downloaded by the each unique user; and
    verifying that the each unique user has actually downloaded the content title.

8. A tangible computer-readable medium storing a plurality of instructions which, when executed by a processor, cause the processor to perform operations for tracking content in a peer-to-peer environment, the operations comprising:
    monitoring a number of times each content title of a plurality of content titles are downloaded in the peer-to-peer environment;
    adding a content title of the plurality of content titles that is downloaded above a predetermined threshold to a list;
    downloading the content title in the list via the peer-to-peer environment; and
    verifying that the content title that is downloaded matches a content title in the list.

9. The tangible computer-readable medium of claim 8, wherein monitoring comprises crawling search engines.

10. The tangible computer-readable medium of claim 8, wherein the list comprises a torrent associated with the content title in the list.

11. The tangible computer-readable medium of claim 8, wherein the verifying comprises:
    generating a content signature of the content title that is downloaded; and
    determining whether the content signature of the content title that is downloaded matches a content signature of a content title in the list.

12. The tangible computer-readable medium of claim 8, wherein the list is ordered from most popular to least popular.

13. The tangible computer-readable medium of claim 8, further comprising:
    identifying each unique user that has downloaded the content title in the list.

14. The tangible computer-readable medium of claim 13, further comprising:
    contacting the each unique user to request to download from the each unique user the content title downloaded by the each unique user; and
    verifying that the each unique user has actually downloaded the content title.

15. A system for tracking content in a peer-to-peer environment, comprising:
    a processor; and
    a computer-readable medium in communication with the processor, storing a plurality of instructions which, when executed by the processor, cause the processor to perform operations, the operations comprising:
        monitoring a number of times each content title of a plurality of content titles are downloaded in the peer-to-peer environment and adding a content title of the plurality of content titles that is downloaded above a predetermined threshold to a list;
        downloading the content title in the list via the peer-to-peer environment; and
        verifying that the content title that is downloaded matches a content title in the list.

16. The system of claim 15, wherein the monitoring comprises:
    crawling search engines;
    subscribing to an RSS feed; and
    using network probes that intercept peer to peer communications.

17. The system of claim 15, wherein the list comprises a torrent associated with the content title in the list.

18. The system of claim 15, wherein the verifying comprises generating a content signature of the content title that is downloaded and determining whether the content signature of the content title that is downloaded matches a content signature of a content title in the list.

19. The system of claim 15, further comprising:
    identifying each unique user that has downloaded the content title in the list.

20. The system of claim 19, further comprising:
  contacting the each unique user to request to download from the each unique user the content title downloaded by the each unique user and verifying that the each unique user has actually downloaded the content title.

\* \* \* \* \*